(12) United States Patent
Morse et al.

(10) Patent No.: US 7,658,787 B2
(45) Date of Patent: Feb. 9, 2010

(54) EXHAUST FILTER MODULE WITH MECHANICALLY POSITIONABLE SCAN PROBE

(75) Inventors: Thomas C. Morse, Greenville, NC (US); Mark Huza, Columbia, MD (US)

(73) Assignee: Camfil Farr, Inc., Riverdale, NJ (US)

( * ) Notice: Subject to any disclaimer, the term of this patent is extended or adjusted under 35 U.S.C. 154(b) by 743 days.

(21) Appl. No.: 11/380,781

(22) Filed: Apr. 28, 2006

(65) Prior Publication Data

US 2006/0272301 A1    Dec. 7, 2006

Related U.S. Application Data

(60) Provisional application No. 60/675,678, filed on Apr. 28, 2005.

(51) Int. Cl.
*B01D 46/44* (2006.01)
(52) U.S. Cl. .......... 95/273; 55/385.2; 96/413; 96/417; 73/40.7
(58) Field of Classification Search ............ 55/417, 55/418, 419, 420, 495, 502, 503, 385.2, 385.3; 73/40, 40.7, 37, 49.7, 863.23, 863.58; 210/348, 210/418; 95/273; 96/413, 417
See application file for complete search history.

(56) References Cited

U.S. PATENT DOCUMENTS

| | | | |
|---|---|---|---|
| 4,494,403 A * | 1/1985 | Bowers et al. | 73/40.7 |
| 4,494,404 A | 1/1985 | Strifler et al. | |
| 4,683,762 A | 8/1987 | Aurich | |
| 7,186,286 B2 * | 3/2007 | Morse | 55/417 |
| 7,210,363 B2 * | 5/2007 | Morse et al. | 73/863.23 |
| 2006/0053864 A1 | 3/2006 | Morse et al. | |
| 2008/0216457 A1 * | 9/2008 | Morse et al. | 55/502 |

FOREIGN PATENT DOCUMENTS

| | | |
|---|---|---|
| DE | 298 10 150 U1 | 5/1998 |
| DE | 10011940 A1 | 9/2001 |
| EP | 1 057 515 A1 | 12/2000 |

OTHER PUBLICATIONS

European Search Report for PCT/US2006016270 dated Jul. 17, 2009. Provides explanation of foreign reference DE 298 10 150 U 1.
Camfil Farr, Inc. Pharmaseal ® Roomside Replaceable Ducted Ceiling Module Brochure, Product Sheet, pp. 1-8, date unknown.
PCT Search Report for PCT/US 06/16270 dated Aug. 29, 2007.

* cited by examiner

*Primary Examiner*—Duane Smith
*Assistant Examiner*—Minh-Chau T Pham
(74) *Attorney, Agent, or Firm*—Patterson & Sheridan, LLP; Keith P. Taboada

(57) ABSTRACT

Embodiments of the invention generally provide a filter module having a mechanically positionable test probe disposed therein and a method for testing a filter. In one embodiment, a filter module includes a housing adapted to receive a filter element. A sample probe suitable for leak testing the filter element is disposed in the interior volume of the housing. The sample probe may be moved to scan the filter by an actuator. In another embodiment, a method for testing a filter includes challenging a room side of a filter element disposed in a housing with a test aerosol, moving a probe disposed within the housing to obtain samples for testing and determining if the samples exceed a predefined leak criteria.

26 Claims, 9 Drawing Sheets

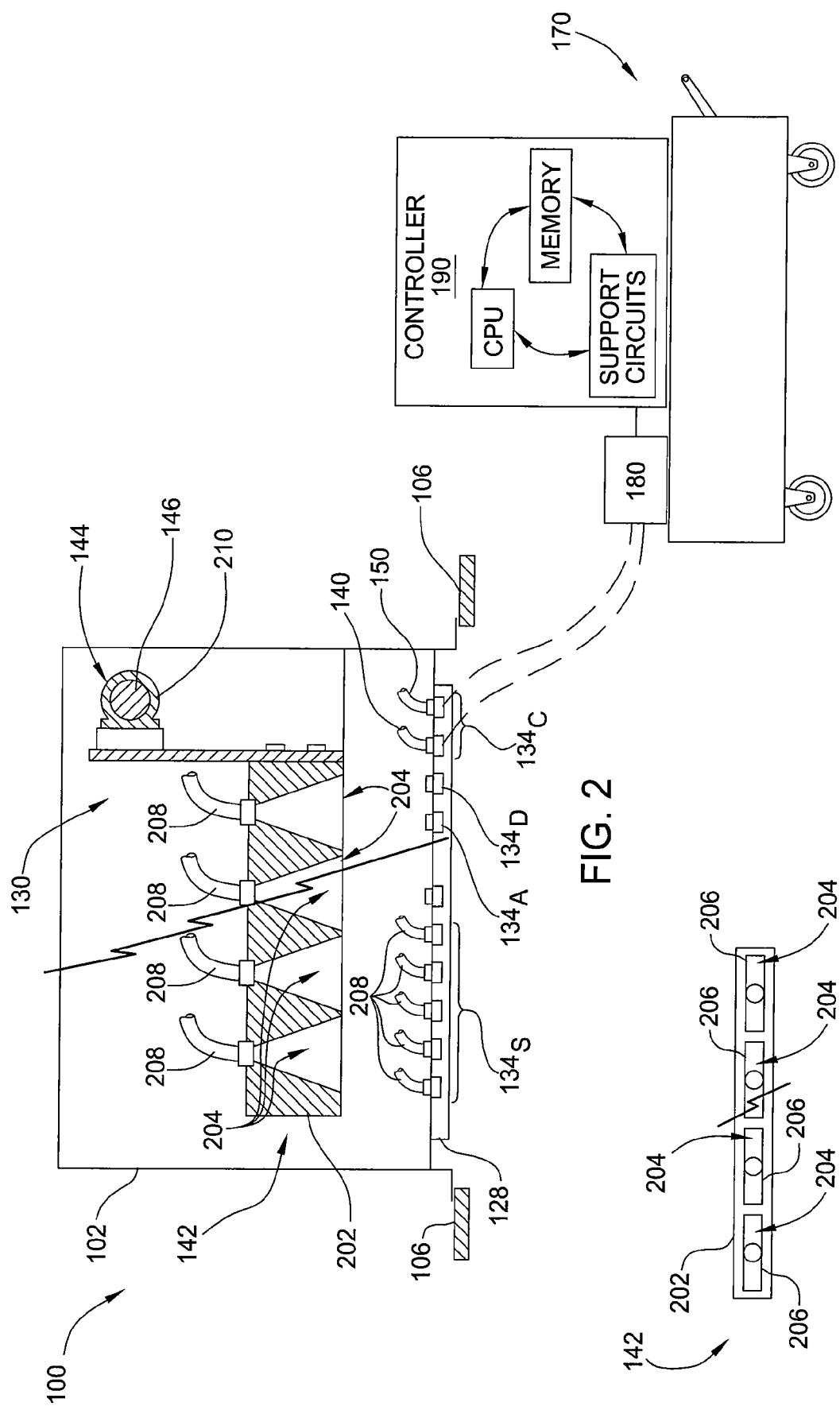

EXHAUST FILTER MODULE WITH MECHANICALLY POSITIONABLE SCAN PROBE

This application claims benefit of U.S. Provisional Application No. 60/675,678, filed Apr. 28, 2005, which is hereby incorporated by reference in its entirety. This application is also related to U.S. application Ser. No. 11/380,737, filed Apr. 28, 2006, entitled "INTEGRATED CONTAINMENT SYSTEM" which is hereby incorporated by reference in its entirety.

BACKGROUND OF THE INVENTION

1. Field of the Invention

The invention generally relates to a filter module having a mechanically-positionable test probe.

2. Description of the Related Art

In many cleanroom applications, filters are often required to be scan-tested for leaks after installation. This requirement is problematic when the space available downstream of the filter is limited, as positioning a probe during testing may become difficult, if not impossible, to perform. Examples of such applications where access to the downstream side of the filter is limited, but are not limited to, housings utilized in filtered exhaust applications.

For example, in a filtered exhaust application, the interstitial space defined between a housing and a filter disposed therein can often not be readily accessed by a technician. While the face of the filter is exposed to the room in which the filter is operating, the housing is disposed in the surrounding structure, such as a wall, ceiling or floor, which is essentially inaccessible from the room without breaking the pressure barrier defined by the structure. Thus, testing of the installed exhaust filter is usually performed in a reverse flow direction to facilitate scanning from the cleanroom side of the filter. This manner of testing is controversial, as many believe that some pin hole filter leaks are flow direction dependent, and as such, a filter passing a scan test with air flowing in a first direction, may leak when the flow through the filter is reversed to the direction used during operation of the cleanroom. As leaking filters may pose health hazards, allow downstream contamination, and present regulatory issues or other undesirable problems, it is highly desirable to test installed filters in the same flow direction utilized during normal filter operation.

Thus, there is a need for a filter housing having an integrated probe which can be mechanically positioned to facilitate scanned leak detection of a filter installed in the housing.

SUMMARY OF THE INVENTION

Embodiments of the invention generally provide a filter module having a body configured to extend into an interstitial space behind a structure bounding a work space. The filter module has a mechanically positionable test probe disposed therein. Embodiments of the invention also include a method for testing a filter mounted in such a module. In one embodiment, a filter module includes a housing having a face exposed through an aperture formed in a structure. The filter module is adapted to receive a filter element through the aperture. A sample probe suitable for leak testing the filter element is disposed in the interior volume of the housing. The sample probe is moved (i.e., moved within the housing) to scan the filter using a motion mechanism, such as an actuator.

In another embodiment, a filter module includes a housing configured to extend into an interstitial space behind a structure bounding a work area, and a mechanically positionable test probe disposed in the housing. A sample probe suitable for leak testing a filter element is disposed in the interior volume of the housing. The position of the sample probe may be controlled from within the filter housing, from the cleanroom, or from another location within the facility in which the filter module is disposed. Optionally, one or more of the devices utilized to test the filter element, for example, a blower, aerosol generator or controller, may be disposed in another location within the facility in which the filter module is disposed.

In yet another embodiment, a method for testing a filter includes challenging a room side of a filter element disposed in a housing with a test aerosol, moving a probe disposed within the housing to obtain samples for testing, and determining if the samples exceed a predefined leak criteria.

BRIEF DESCRIPTION OF THE DRAWINGS

The accompanying drawings, which are incorporated in and constitute a part of the specification, schematically illustrate the present invention, and together with the general description given above and the detailed description given below, serve to explain the principles of the invention.

FIG. 2 is a sectional view of the filter module of FIG. 1;

FIG. 3 is a bottom view of one embodiment of a probe;

To facilitate understanding, identical reference numerals have been used, where possible, to designate identical elements that are common to the figures. It is contemplated that elements of one embodiment may be beneficially incorporated in other embodiments.

DETAILED DESCRIPTION

Figure 1:
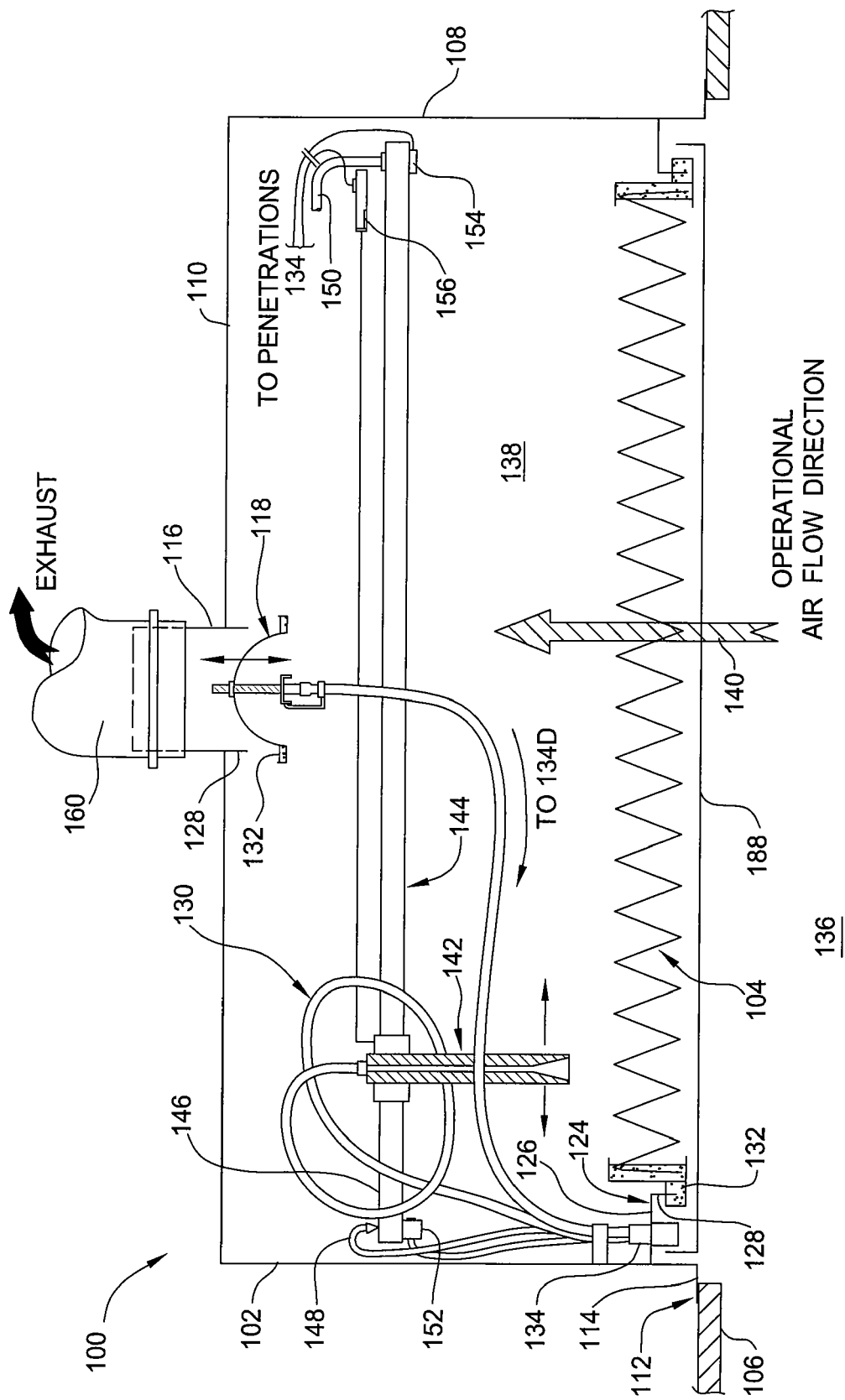
FIG. 1 is a sectional view of one embodiment of a filter module having an integrated autoscan mechanism.

FIG. 1 is a filter module 100 having an integrated autoscan mechanism 130. Although the filter module 100 depicted in FIG. 1 is configured as a filtered exhaust for a cleanroom application, the autoscan mechanism described herein may be beneficially configured to benefit other filter housings, such as panels and diffusers used in exhaust applications. It is intended that the term "cleanroom" may refer to any laboratory, machine enclosure, room or space serviced by the filter module 100. It is intended that the term "structure" may refer to any wall, ceiling, panel or floor of the cleanroom. It is intended that the term "interstitial space" refer to the area on the other side of the structure in which the filter module is mounted that is not in the cleanroom serviced by the filter module.

The filter module 100 generally includes a housing or hood 102 which sealingly mounts a filter element or filter 104 to a structure, such as a ceiling 106 of a cleanroom, such that a face of the hood faces the cleanroom while the body of the hood is disposed in the interstitial space. In one embodiment, the hood 102 includes sidewalls 108 and a backplate 110. The hood 102 may be fabricated from any suitable material such as plastic, fiberglass, stainless steel and aluminum, among other suitable materials. The hood 102 includes a mounting portion 112 to facilitate mounting the hood 102 to the ceiling 106 of the cleanroom. The mounting portion 112 generally circumscribes a filter receiving aperture of the hood 102 defined on the face of the hood 102, such that the hood 102 itself resides in the interstitial space behind the structure. In the embodiment depicted in FIG. 1, the mounting portion 112 includes a flange 114 extending outward at about a right angle from the sidewall 108 of the hood 102. The flange 114 may be coupled to the ceiling 106 by any variety of methods, including by fasteners. It is contemplated that the hood 102 may be mounted to and/or rest upon the ceiling 106 or other structure of the cleanroom (i.e., floor or wall or equipment disposed therein) by other methods.

A collar 116 is sealingly coupled to or formed in the backplate 110 to facilitate removal of air (or other fluid) entering the module 100 though the filter 104. A damper 118 may be provided in the module 100 to control the rate of flow through the collar 116. Dampers for this use are well know in the art, and one suitable damper that may be adapted to benefit from the invention is described in U.S. patent application Ser. No. 10/863,629 filed Jun. 8, 2004, by Morse et al., which is hereby incorporated by reference in its entirety.

In the embodiment depicted in FIG. 1, the damper 118 includes a gel-filled track 132 that selectively provides a bubble-tight seal when engaged with a knife edge 128 extending from the hood 102 and/or collar 116. The gel may be a silicon gel, polyurethane gel, or other material suitable for selectively sealing the damper 118 to the module 100. Alternatively, a bubble-tight seal may be formed by a gasket or other suitable material. The bubble-tight seal allows an interior volume 138 of the module 100 to be isolated from the ducted exhaust 160 coupled to the collar 116. In this manner, residence time of agents, used to decontaminate the internal volume 138 of the module 100 may be increased to more effectively decontaminate and/or clean the internal surfaces of the module 100.

The hood 102 includes a sealing portion 124 configured to provide an airtight interface between the module 100 and the filter 104 mounted therein. In the embodiment depicted in FIG. 1, the sealing portion 124 includes a flange 126 and a knife edge 128. In the embodiment depicted in FIG. 1, the knife edge 128 extends downward from the flange 126 and sealingly engages a fluid seal 132 of the filter 104. The fluid seal 132 may be a silicon gel, polyurethane gel, or other material suitable for selectively sealing the filter 104 to the module 100.

It is contemplated that the seal between the filter 104 and module 100 may have alternative configurations. In one example, the fluid seal may be replaced by a gasket disposed between the filter 104 and module 100. In another embodiment, the filter 104 may be permanently coupled by adhesive to the hood 102 in a terminal diffuser or panel filter arrangement. Suitable filters are available from Camfil Farr, Inc., located in Riverdale, N.J.

The flange 126 supporting the knife edge 128 extends inward from the sidewalls 108 of the hood 102. The flange 126, along at least one sidewall 108, is wide enough to accommodate a plurality of penetrations, generically identified with reference numeral 134, one of which is shown in FIG. 1. The penetrations 134, as further described below, allow selective access to the interior volume 138 of the module 100 while maintaining isolation between an interior 136 of the cleanroom and the area on the opposite side of the filter to housing seal. The penetrations 134 may be utilized for sample ports, transmitting pressure information, transmission of metrology information, control signals, mechanical power transfer and electrical power, among other uses. For ease of explanation, penetrations utilized for sampling are identified with subscript "S", penetrations utilized for positional information (encoder, linear variable differential transformer (LVDT), limit switches, and the like) are identified with subscript "C", penetrations utilized for actuator control (electrical, power, fluid power, mechanical power transmission, and the like) are identified with subscript "A", penetrations utilized for positional information, and penetrations having other uses (such as pressure transmission, pressure sensor transmission, and damper control, among others) are identified with subscript "D", as later shown and described with reference to FIGS. 2-3.

A screen 188 may be coupled to the module 100 to protect the filter 104. In one embodiment, the screen is retained on a stud extending from the flange 126 by a nut (not shown). The screen 188 is generally removable to allow selective access to, and replacement of the filter 104. The screen 188 may be configured to allow access to the penetrations 134, such as through the screen, or the penetrations may be located outside of the screen 188. Alternatively, it may be required to remove the screen 188 to access one or more of the penetrations 134.

The autoscan mechanism 130 is disposed in the hood 102 to facilitate scanning of the filter 104 using an airflow direction shown by arrow 140, e.g., from the cleanroom into the internal volume 138 of the hood 102 residing in the interstitial space. The autoscan mechanism 130 includes at least one probe 142 and a motion mechanism, such as an actuator 144. The probe 142 may have any number of designs suitable for particulate scan testing. In one embodiment, the probe 142 conforms to IEST-RP-CC034.1 Recommended Practices. The probe 142 is generally configured to produce isokenetic sampling at a predefined filter test velocity.

FIG. 2 depicts a cross sectional view of the filter module 100 with the filter 104 removed for clarity. FIG. 3 depicts a bottom view of one embodiment of the probe 142. Referring now to FIGS. 2-3, the probe 142 includes a probe body 202 having one or more sample ports 204. The number of sample ports 204 may be selected based on the desired coverage area for a mouth 206 of each port 204, the desired sample velocity and the number of probe passes desired to scan the face of the filter 104. For example, if it is desired that scanning of the filter face be completed in two probe passes, the probe body may be elongated to accommodate the number and geometry of the sample ports selected to cover half the width of the filter 104 with each pass of the probe 142. Each sample port 204 is coupled by a tube 208 to a respective penetration $134_S$.

In the embodiment depicted in FIGS. 2-3, the probe 142 includes 5 sample ports 204 each having a mouth area of about 1.44 square inches. The outermost sample ports 204 on each end of the probe 142 are positioned over the filter to housing sealing area (e.g., over the knife edge 128) so that leaks, including seal leaks that bypass the knife edge 128, may be detected across the entire width of the filter 104 without laterally moving the probe 142 in other than the scan direction.

The actuator 144 may be disposed in the module 100 to position the probe 142. The actuator 144 may be any kind of suitable robot, x-y actuator, a linear actuator, a stepper or servo motor, a fluid power cylinder, a rod-less cylinder, a chain or belt drive, a rack and pinion gear arrangement, a ball, lead, acme or other power screw, or other suitable motion control, motion generating and/or motion facilitating mechanism suitable for moving the probe 142 within the interior volume 138 of the module 100. In the embodiment depicted in FIGS. 1-3, the actuator 144 is a rod-less cylinder 146.

A carriage 210 rides along the cylinder 146. The position of the carriage 210 is controlled by selectively applying air or other fluid to at least one side of the cylinder 146. In the embodiment shown, fluid control lines 148, 150 are provided between the cylinder 146 and penetrations $134_A$ to control the lateral position of the probe 142 in the scan direction from outside of the module 100. For example, the lines 148, 150 may be coupled to a fluid control manifold 180 dissected on a cart 170 inside the cleanroom adjacent the module 100, shown in this embodiment on the cart 170. A controller 190 disposed on a cart 170 inside the cleanroom adjacent the module 100, selectively opens and closes valves of the manifold 180 to control the motion of the carriage 210, and hence the probe 142. It is also contemplated that control of the actuator 144 may be facilitated from other locations within, or remote to, the facility wherein the cleanroom having the module 100 mounted therein.

Sensors disposed in the module 100 may be utilized to provide to the feedback controller for determining the position of the probe 142. This information may be utilized to confirm leaks, or to test filter leak repairs, among other uses. In the embodiment depicted in FIG. 1, two sensors 152, 154, are wired to the controller 190 through the penetration $134_C$ to provide information that may be utilized to determine when the probe 142 is in a predefined position. The sensors 152, 154 may be utilized in calibration routines, or to calculate the probe position utilizing a known or calculated rate of probe travel. The probe travel rate may be determined empirically, calculated based on known or estimated rates associated with control fluid parameters (i.e., pressure, volume and/or rate of fluid passing through control lines 148, 150) and/or by direct measurement.

In one embodiment, a sensor 156 is disposed in the module 100 to obtain a metric indicative of probe position. The sensor 156 may be an optical device, a proximity sensor, an LVDT transducer or other device suitable for determining the position of the probe 142. In the embodiment depicted in FIGS. 1-3, the sensor 156 is a LVDT transducer wired to the controller 190 through the penetration $134_C$.

Figure 4:
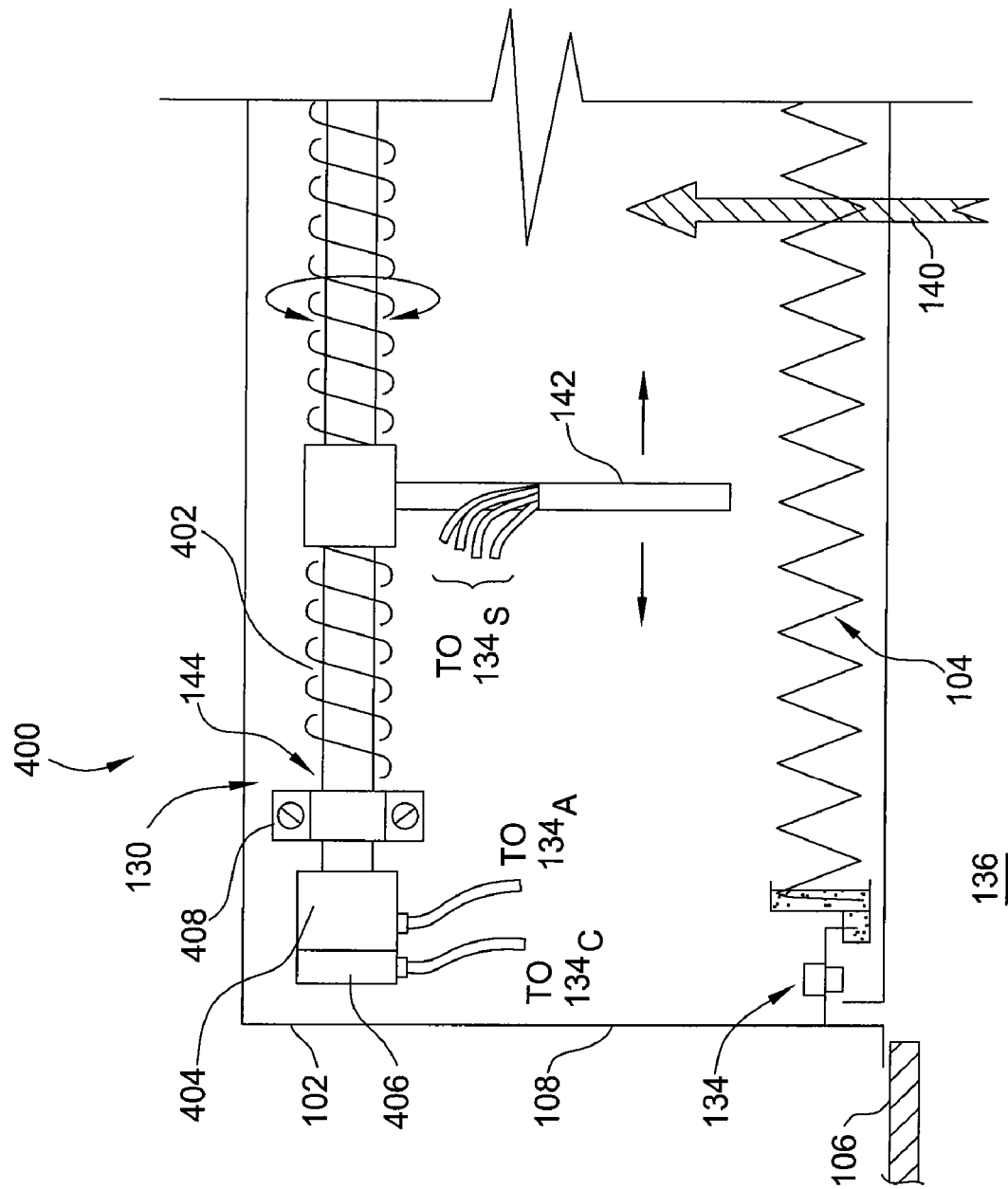
FIG. 4 depicts another embodiment of a filter module having a probe moved by a power screw.

FIG. 4 depicts another embodiment of a filter module 400 having a probe 142 moved by a power screw 402. The power screw 402 is mounted to the hood 102 by one or more bearings 408. The power screw 402 is driven by a motor 404 disposed in the hood 102 of the module 400. A sensor, such as an encoder 406, is provided to determine the revolutions of the power screw 402, and thus, the rate of travel and/or position of the probe 142. Sensors 152, 154, 156 (omitted from FIG. 4 for clarity) may also be utilized as discussed above to calibrate and/or determine the position of the probe. The controls for the motor 404 and wiring for the encoder 406 are wired through penetrations $134_C$ to the controller 190.

Figure 5:
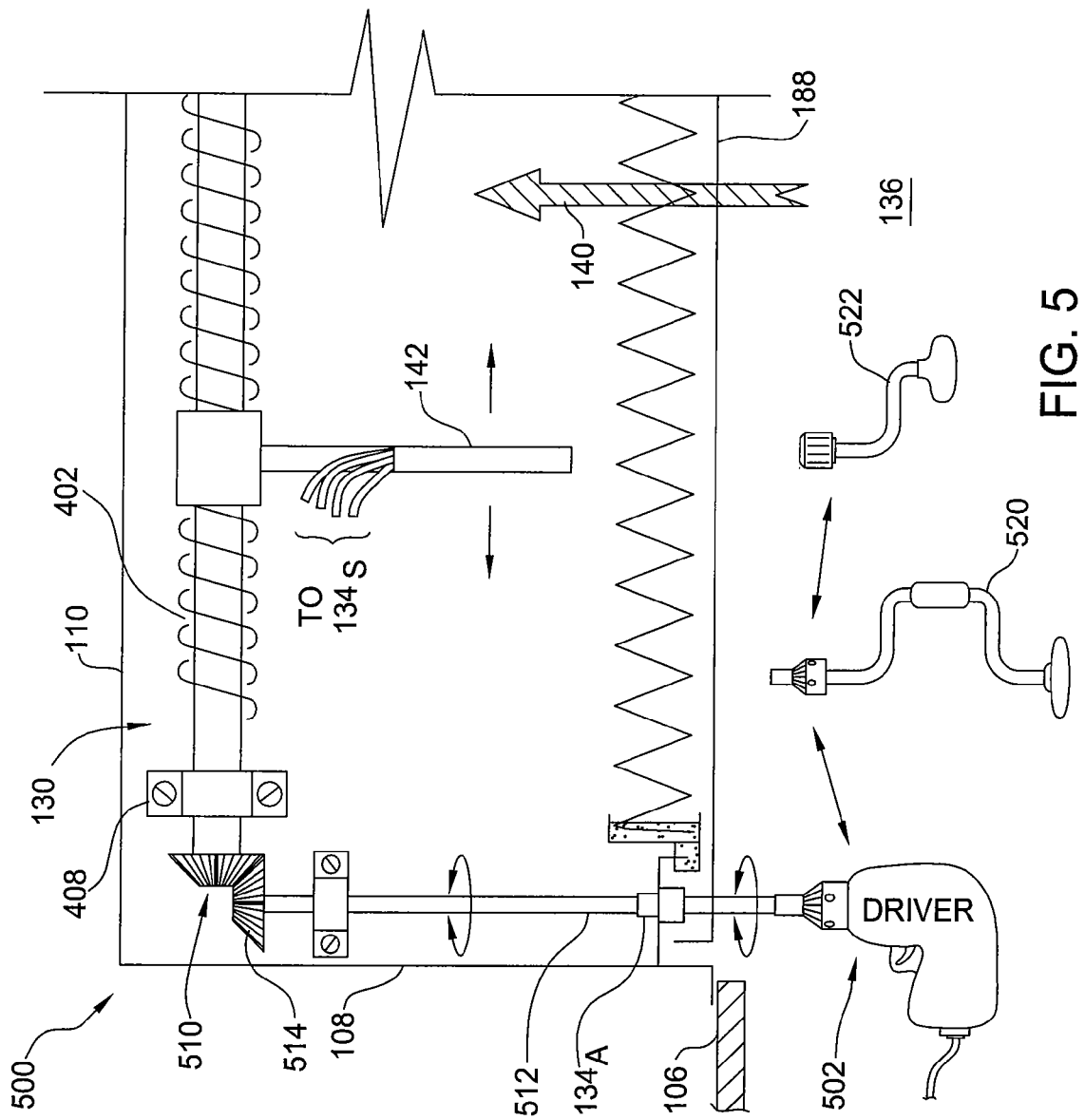
FIG. 5 depicts another embodiment of a filter module having a probe moved by a power screw.
Figure 6:
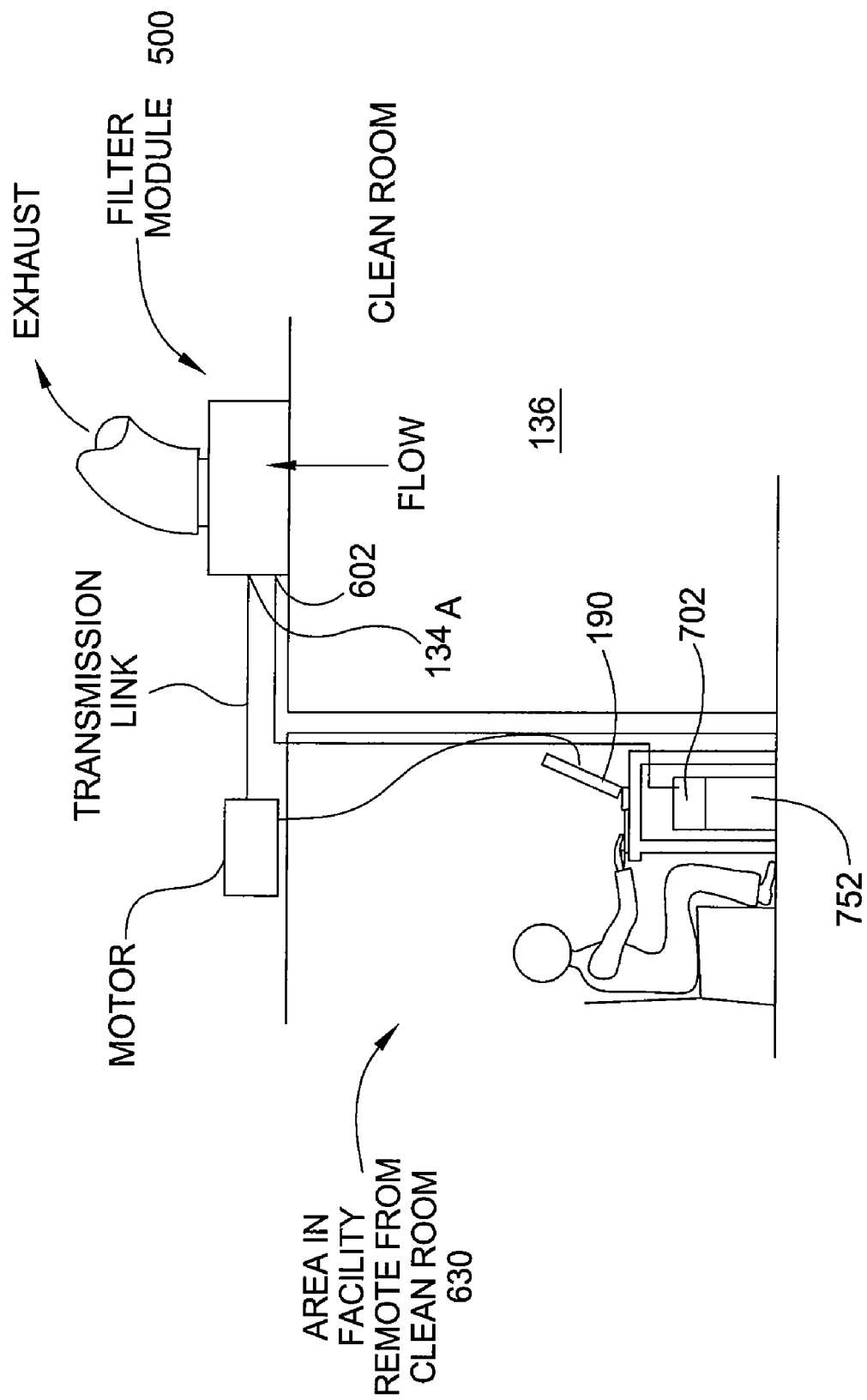
FIG. 6 depicts another embodiment of a filter module.

FIG. 5 depicts another embodiment of a filter module 500 having a probe 142 moved by a motion mechanism shown as a power screw 402. The power screw 402 is driven by a motor 502 disposed outside the filter module 500. The motor 502 may be a portable device, such as a power driver, as shown. Alternatively, the motor 502 may be disposed in a cart (such as the cart 170), and may be coupled to the filter module 500 by a shaft (not shown). Alternatively, a hand tool 520 or a crank handle 522 may be utilized in place of the motor 502 to control the actuator. It is also contemplated that the motor 502 may be disposed remote from the cleanroom in another area of the facility in which the filter module 500 is mounted, as shown in FIG. 6.

Returning to FIG. 5, a power transfer mechanism 510 is disposed in the module 500 as part of the actuator. The power transfer mechanism 510 has a first end 512 accessible from the cleanroom side of the filter module 500 and a second end 514 coupled to the power screw 402. When the motor 502 is coupled thought the penetration $134_A$ to the power transfer mechanism 510, the position of the probe 142 may be selectively positioned or displaced by controllably driving the power screw 402 to facilitate scan testing and/or pin-hole filter leak detection. In one embodiment, the penetration $134_A$ is configured to allow coupling of the power transfer mechanism 510 to the motor 502 without leakage through the penetration $134_A$.

Figure 7:
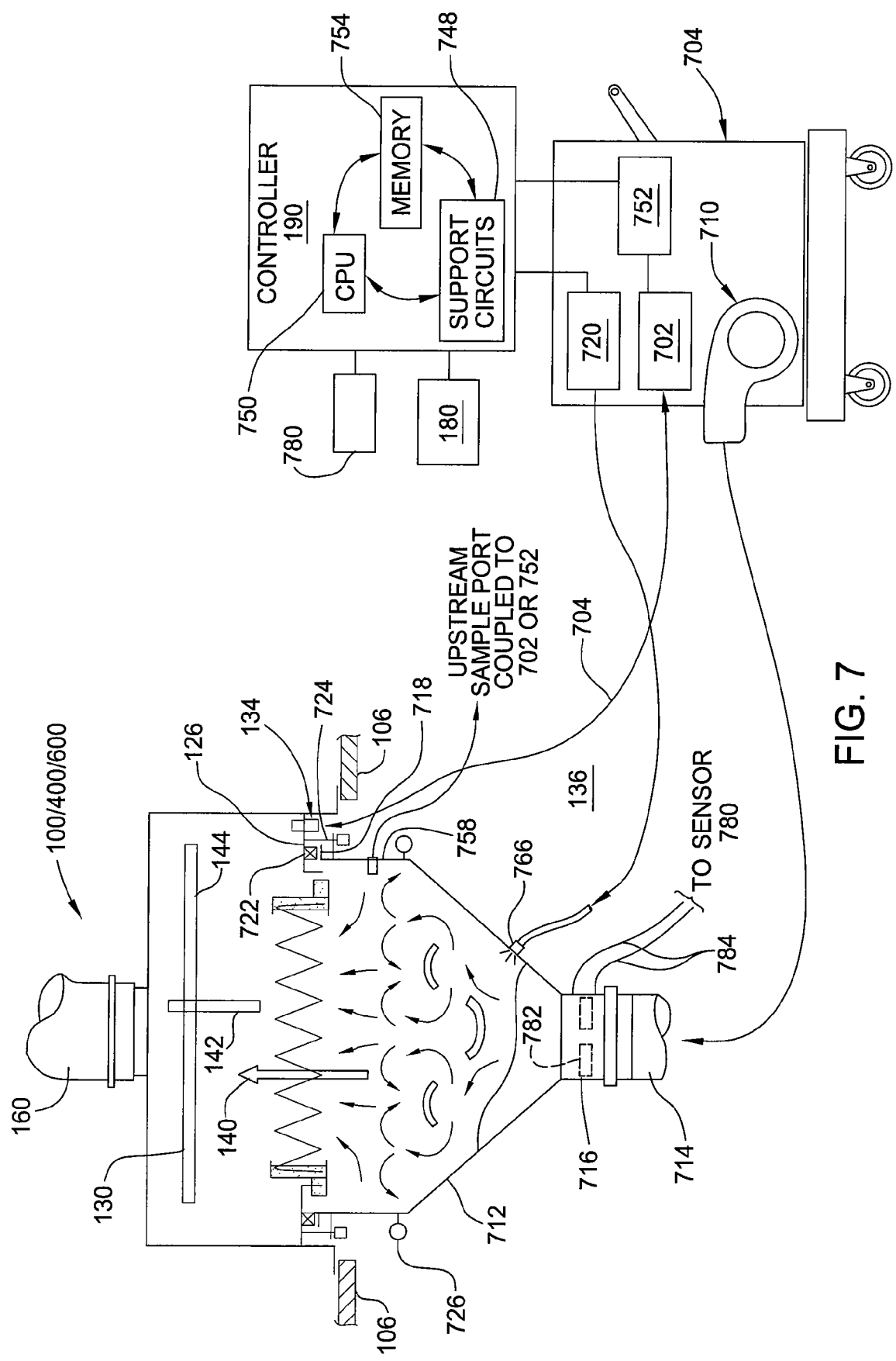
FIG. 7 depicts one embodiment of a cart suitable for carrying equipment utilized to scan test the filter modules shown interfaced with a filter module.

FIG. 7 depicts one embodiment of a cart 704 suitable for carrying equipment utilized to scan test the filter modules such as the modules 100, 400 and 500, described above, among others. The cart 704, as with the similarly equipped cart 170, provides a mobile platform where test equipment, such as one or more testers 752, may be centrally moved between test sites, either within a cleanroom, and or between cleanrooms. The tester 752 may be a photometer and/or particle counter. One photometer that may be utilized is available from Air Techniques Incorporated. The tester 752 may be portable, such as carried by a technician, mounted to a cart 704, as shown in FIG. 7, disposed in predefined location within the facility (as shown in FIG. 6) or other suitable location.

The cart 704 may include the controller 190 and a sample control sequencing system 702 that selectively couples the penetrations $134_S$ to the tester 752 through a plurality of sample lines 704 (of which, one line 704 is shown in FIG. 7). Each sample line 704 may be labeled and/or color coded to facilitate coupling with a predefined penetration $134_S$ associated (i.e., couple to) a predefined port 204 of the probe 142.

Figure 8:
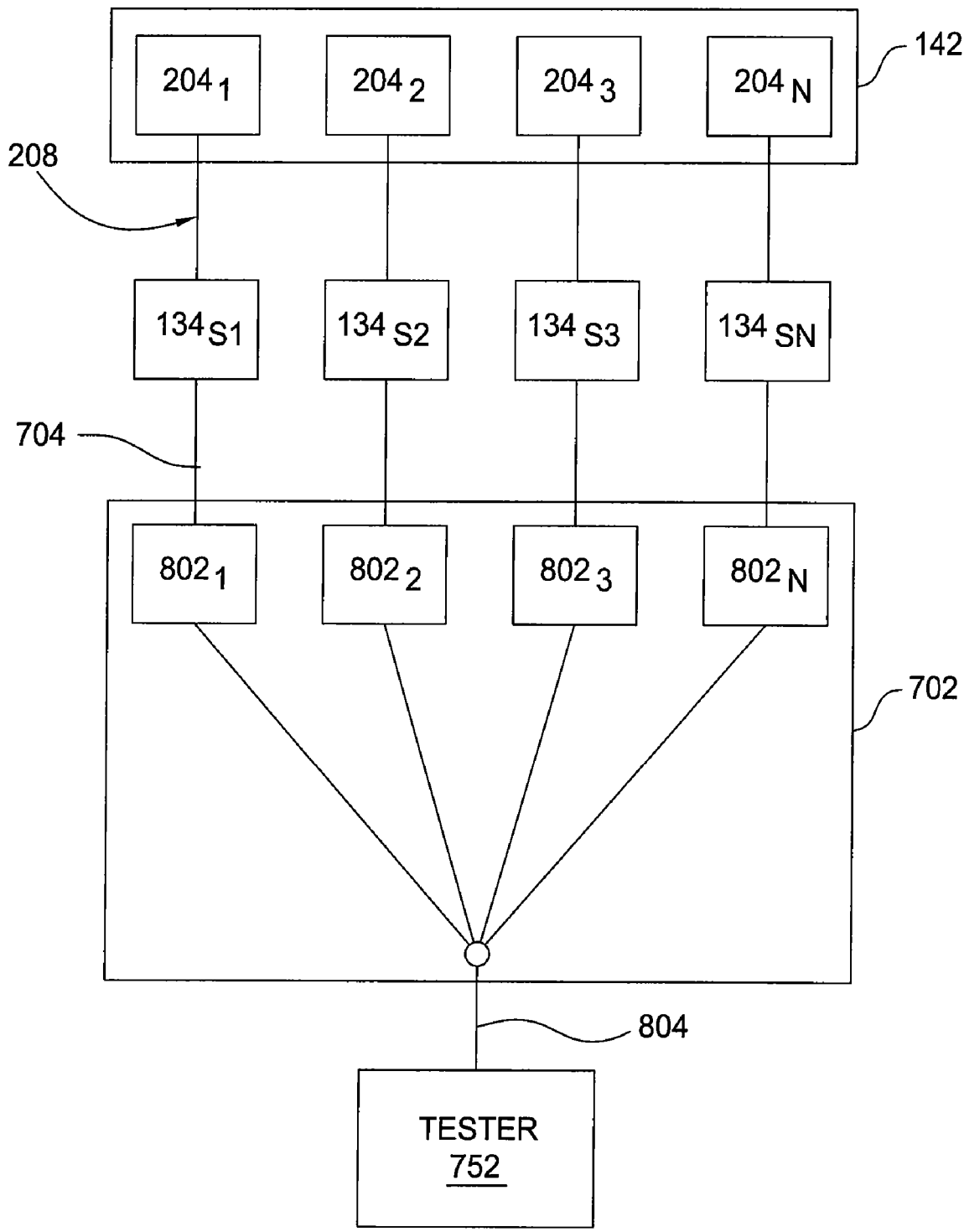
FIG. 8 depicts a block diagram illustrating the selective coupling of a probe to a tester.

Referring to both FIG. 7 and the block schematic of one embodiment of a sequencing system 702 depicted in FIG. 8, the sequencing system 702 includes a plurality of valves having a common output line 804. Generally, the sequencing system 702 is configured with at least the same number of valves as the number of ports of the probe 142. For sake of explanation, there are N valves $802_N$ coupled to N sample ports $204_N$ through N penetrations $134_{SN}$ in the schematic of FIG. 8, where N is a positive integer.

The output line 804 is coupled to the tester 752. By controlling which valve $802_N$ is opened, the tester 752 will be selectively coupled to a predetermined one of the sample ports $204_N$ of the probe 142. Thus, by synchronizing the openings of the valves $802_N$ with the motion of the probe 142, the tester 752 will be sequentially provided with test samples, which in total, correspond to the entire face of the filters. In one embodiment, the synchronization of the valves $802_N$ and the motion of the probe 142 is configured to scan the filter in accordance with IES-RP-CC034.1 Recommended Practices. It is also contemplated that the motion and sampling may be integrated to meet other test criteria.

Moreover, as the position of the probe 142 is fully controllable by the controller, the probe 142 may be positioned over a predetermined location, and the requisite sample port 204 coupled to the tester 752, to allow testing of a predefined filter location. This feature enables retesting and validation of leak repairs.

Optionally, one of the valves $804_N$ may be utilized to selectively enable the tester 752 to obtain an upstream sample of the aerosol challenge. For example, one of the valves $804_N$ may be coupled to a sample port 758 formed in an adapter hood 712, which is further described below.

The cart 704 may also include a blower 710 and test challenge generator 720. The blower 710 is generally sized to provide 60-150 feet per minute of fluid flow, typically air, through the filter 104. The blower 710 may be coupled to the cleanroom side of the filter 104 by the adapter hood 712. The adapter hood 712 has a collar 716 on a first side for coupling to the blower 710 using a flexible duct 714. The adapter hood 712 also has a seal interface 718 on a second side for interfacing with the filter module 500 to ensure that substantially all of the test flow goes through the filter and into the hood. The seal interface 718 may include a gel or gasket seal (a gasket 722 is shown in FIG. 7) that interfaces with the housing or filter outside of the face of the filter such that the entire face of the filter may receive air flow from the blower 710 with substantial uniformity. It is contemplated that the adapter hood 712 may include internal features to promote flow uniformity through the filter 104 and uniform mixing/distribution of aerosol across the face of the filter 104. It is also contemplated that the hood 102 and the adapter hood 712 may include an arrangement, such as a latch and catch, for securing the hood 102 to the adapter hood 712 during testing. In the embodiment depicted in FIG. 7, the adapter hood 712 is secured by a nut threaded on a stud 724 extending from the flange 126 of the filter module 100. The stud 724 is normally utilized to secure the screen when present. The adapter hood 712 may additionally include a handle 726 to facilitate handling.

A flow measurement device is generally provided to allow monitoring and/or control of the flow from the blower 710. Any suitable flow measuring device may be utilized. In the embodiment depicted in FIG. 7, an orifice plate 782 (shown in phantom) is provided in the adapter hood 712. Pressure ports 784 are disposed on either side of the orifice plate 782, and are coupled to a differential pressure sensor 780. The differential pressure sensor 780 is coupled to the controller 190 and provides a metric indicative of air flow through the hood 712. The controller 190 may automatically adjust the flow from the blower 710 to maintain a predetermined test flow rate selected for the filter being tested. The controller 190 may additionally flag and/or prevent testing of a filter when a prerequisite flow rate is not provided and/or not maintained during testing.

The aerosol generator 720 is generally suitable for providing an aerosol challenge suitable for a statistically valid leak detection. In one embodiment, the aerosol generator is a Laskin Nozzles generator, capable of producing aerosol concentrations of 10-90 µg/L. An outlet port of the aerosol generator 720 is coupled to the injection port 766 formed in the adapter hood 712 and/or duct 714 to provide the challenge to the cleanroom side of the filter 104 disposed in the module 500. Suitable aerosol generators are commercially available from a variety of sources, some of which may meet IES-RP-CC034.1 Recommended Practices.

The controller 190 is provided to control the motion of the probe 142 and to facilitate leak testing. As such, the controller 190 is coupled to the autoscan mechanism 130 and sensors through the penetrations 134. The controller 190 is also coupled to the tester 752 and the sequencing system 702. The controller 190 includes a central processing unit (CPU) 750, support circuits 748 and memory 754. The CPU 750 may be one of any form of computer processor that can be used in an industrial setting for controlling at least one of the motion of the probe 142, recording test results and leak position identification. The memory 754 is coupled to the CPU 750. The memory 754, or computer-readable medium, may be one or more of readily available memory such as random access memory (RAM), read only memory (ROM), flash memory, floppy disk, hard disk, or any other form of digital storage, local or remote. The support circuits 748 are coupled to the CPU 750 for supporting the CPU 750 in a conventional manner. These circuits include cache, power supplies, clock circuits, input/output circuitry, subsystems, and the like. A plurality of instructions, stored in memory 754 as computer readable medium, is executable by the controller 190 to perform a method for scan testing.

Figure 9:
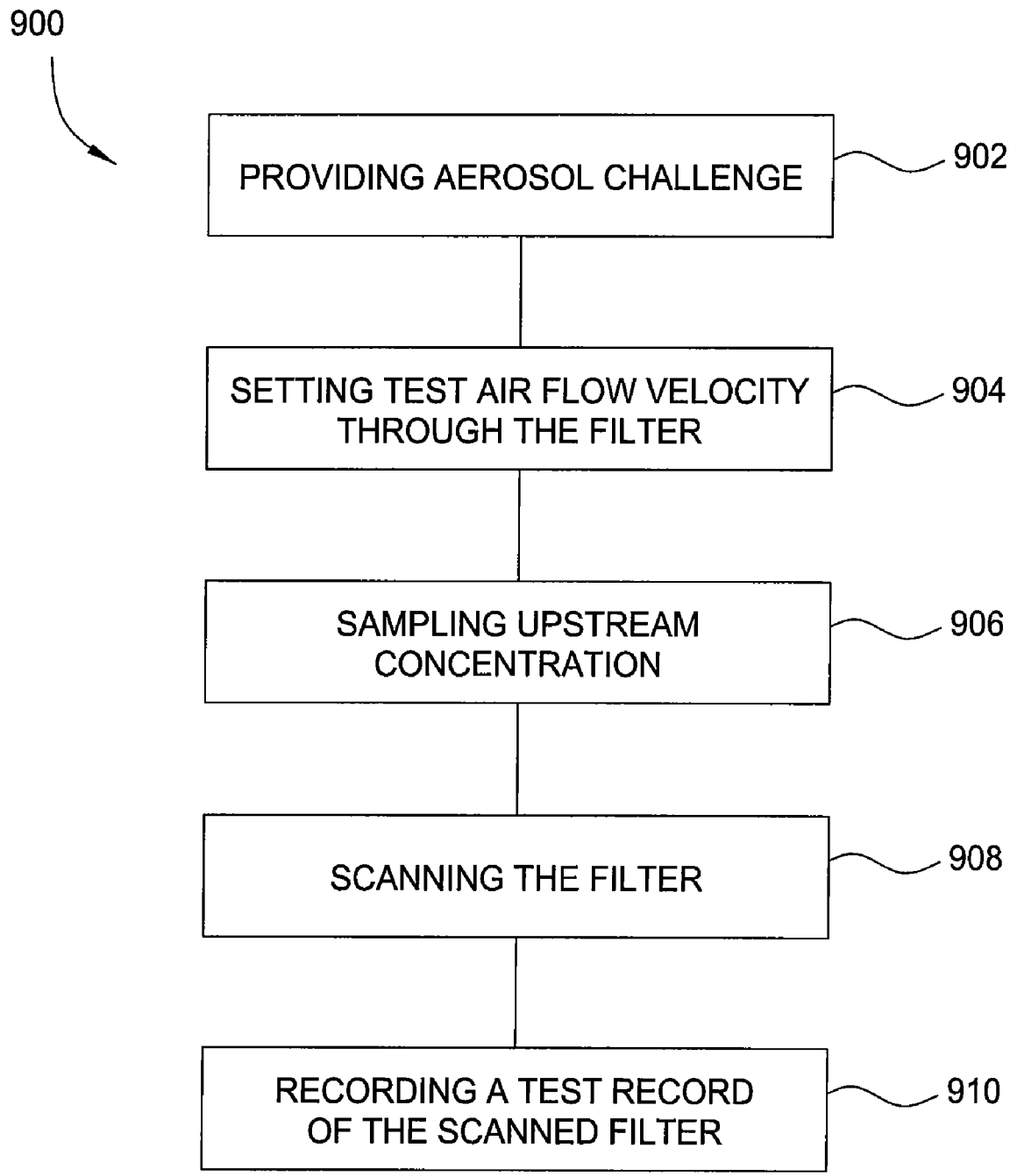
FIG. 9 depicts a flow diagram of one embodiment of a method for scan testing a filter.

FIG. 9 is a flow diagram of one embodiment of a method 900 for scan testing a filter mounted in a hood coupled to a structure, wherein the filter is exposed to the work area while the hood resides in an interstitial space behind the structure. The method 900 starts at step 902 by providing an aerosol challenge to the room side face of the filter. In one embodiment, the aerosol may be provided using the aerosol generator 720 and the adapted hood 712 to deliver the challenge to the face of the filter 104 on the cleanroom side of the ceiling 106.

At step 904, the test velocity is set to a predefined rate generally selected for the square footage of filter media present in the filter under test. The test velocity may be set by providing an air flow to the adapted hood 712 from a blower, such as the blower 710 disposed in the cart 704. Alternatively, the air flow may be provide by the exhaust blower coupled to the collar 116 of the filter module normally utilized to pull air from the cleanroom through the filter 104. It is also contemplated that other sources of air flow may be utilized.

At step 906, an upstream sample of the challenge is taken. In one embodiment, the upstream sample is taken by opening one of the sample valves of the sequencing system 702 that connects a port in the duct or adapter hood 712 to the photometer. A leak threshold (i.e., downstream sample particle limit) is generally determined based on the upstream concentration and the efficiency of the filter under test. The leak threshold may additionally be defined by relevant specifications, regulations, industrial standards or contract. Many facilities are tested using leak thresholds defined by IES-RP-CC01.3 Recommended Practices.

At step 908, scanning begins by moving the probe 142 within the filter hood 102. The probe, actuators and motion mechanisms are configured to move the probe completely over the entire downstream face of the filter during leak testing using one or more probe passes. The probe, actuators and motion mechanisms may also be configured to cover the interface between the filter and hood during leak testing In one embodiment, a first sample port 204 of the probe 142 is coupled to the tester 752 during a first pass of the probe. Upon completion of the first pass, the valves of the sequencing system 702 are actuated to couple a second sample port of the probe 142 to the tester 752 during a second pass of the probe 142 across the filter 104. The other sample ports 204 of the probe 142 are respectively coupled to the tester 752 on subsequent probe passes until the entire face of the filter is scanned. The motion may also be configured such that the seal between the filter and housing is also leak tested.

In another embodiment, sufficient testers are coupled to each sample port 204 to enable complete leak detection scanning of the entire filter face in a single pass. In another embodiment, the motion of the probe 142 is intermittent such that the sequencing system 702 couples each sample port 204 sequentially to the tester 752 during each dwell period of the probe movement. After sampling is completed from each port for a given probe location, the probe 142 is incrementally moved to the next location for another sampling sequence. This sequence of move, sample, move is repeated until the entire face of the filter is tested.

In yet another embodiment, the autoscan mechanism 130 is configured to move the probe 142 in at least two directions. Thus, scanning may be accomplished at stated above, and with any of the sequences described above, except wherein the probe is moved laterally at least one or move times between passes in the scanned direction. An example of one suitable mechanism is described further below with reference to FIG. 9.

At an optional step 910, a record of the scan test is generated. The test record may be stored in the memory of the controller, and/or a printed record may be generated. The record may include, but is not limited to, the filter identification, the test flow rate, the upstream challenge concentration, the downstream particulate penetration at a given location (e.g., leak magnitude), the pressure drop across the filter, position of leaks, calculated global efficiency and a pass/fail determination. Advantageously, the filter modules and test method described herein enables scan testing of filters housed in a hood residing in the interstitial space of a structure, thereby allowing the filter to be scanned in its installed location (e.g., operational location at the final users site, not to include bench testing at any location) without exposure to technicians or other persons by accessing the downstream side of the filter while testing.

FIG. 6 is a schematic plan view of a portion of a facility having a filter module 500 of the present invention disposed therein. The filter module is substantially similar to the filter modules described above, except that at least some of the penetrations (shown as penetration 602) are plumbed outside the cleanroom through the facilities to a sequencing system 702 and tester 752 remote from the cleanroom so that at least a portion of the test and/or control of the testing may be performed in a predefined facility location outside of the cleanroom. Although a single filter module is shown in FIG. 6 coupled to the tester, it is contemplated testing of multiple filter modules may be facilitated using a single tester and controller. This configuration is particularly advantageous in facilities that require decontamination of equipment exiting the cleanroom. In one example, plumbing between the penetrations 602 may be run to a central location, for example, a utility room 630 outside the cleanroom. The sequencing system 702 and the tester 752 may also be disposed in the central location to again minimize the amount of equipment exposed in the cleanroom environment.

In some embodiments, the aerosol generator 720 (not shown in FIG. 6) may also be disposed in outside the cleanroom. The aerosol generated may be delivered into the cleanroom to provide a challenge to the face of the filter, for example, using the adapter hood 712, by a conduit (not shown) entering the cleanroom through a penetration in the filter module or ceiling (walls or floor) of the cleanroom. The test flow may be provided using a blower 710 disposed in the cleanroom, or by the facilities exhaust system coupled to the filter module.

In another embodiment, the aerosol may be plumbed from the utility room to an aerosol dispersion device mounted to the housing of the filter module. The aerosol dispersion device is plumbed to the aerosol generator disposed outside the cleanroom, for example, by piping routed above the cleanroom ceiling. In the embodiment depicted in FIG. 6, the aerosol dispersion device is a grid of tubing suspended below the face of the filter from the housing and having a plurality of holes arranged to provide a uniform distribution of aerosol to the face of the filter.

It is also contemplated that the blower may be located outside the cleanroom. In such an embodiment, a port, disposed in the wall (ceiling or floor) of the cleanroom, may be coupled to an adapter hood 712, as described above, using a flexible duct to provide flow to the face of the filter during testing. In the manner, the amount of equipment entering the cleanroom is minimized.

In another embodiment, the sequencing system, the tester, blower and/or aerosol generator may be disposed in the cleanroom, for example, on a dedicated bench or mini-environment. Plumbing between the equipment and the housing may be permanently mounted, or routed therebetween when testing is desired.

Figure 10:
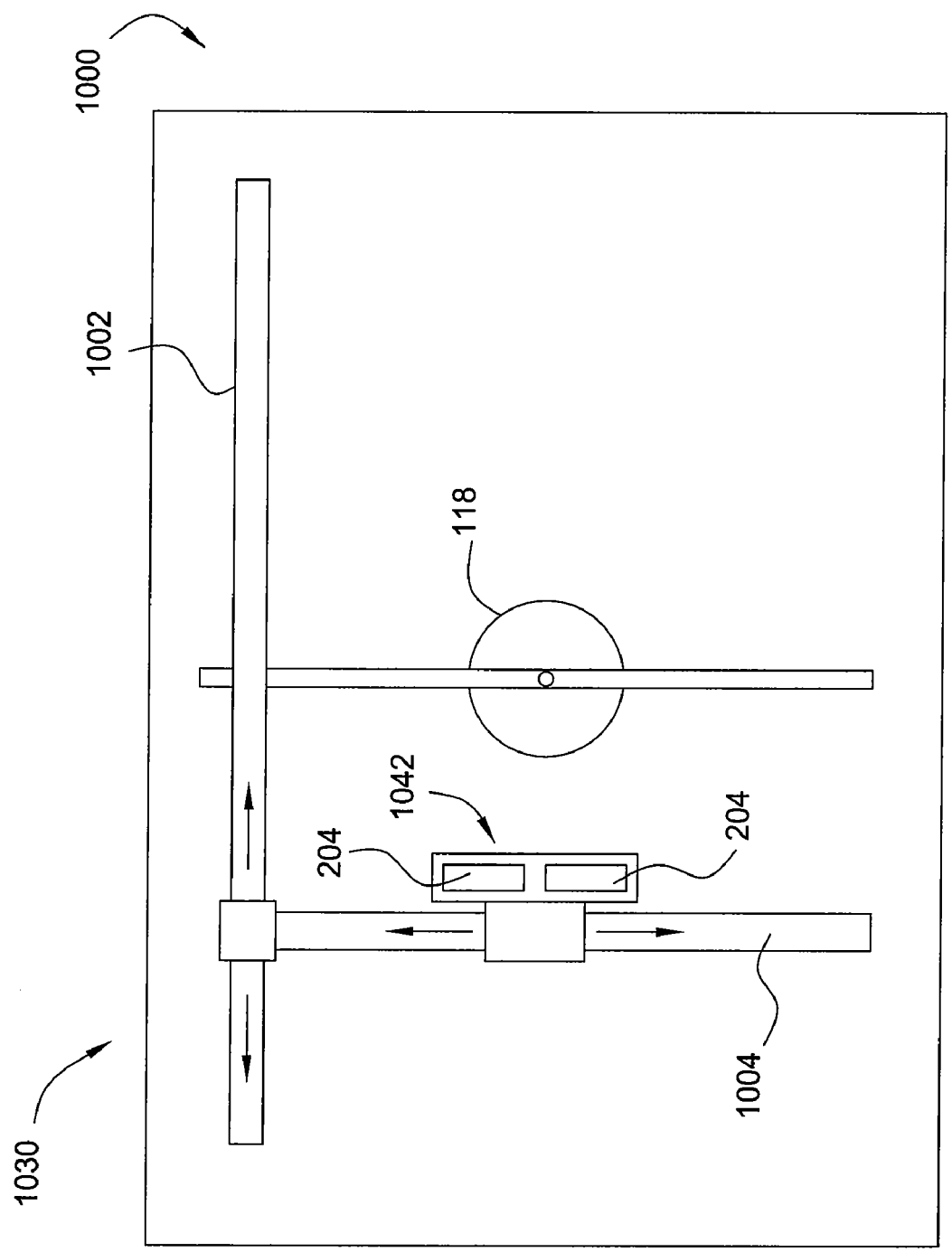
FIG. 10 depicts a bottom view of another embodiment of an autoscan mechanism.

FIG. 10 depicts one embodiment of an autoscan mechanism 1030 that may be utilized to position a probe 1042 in a filter module 1000. The probe 1042, filter module 1000 and equipment (e.g., aerosol generator, blower, tester, etc.) utilized to test a filter disposed in the module 1000 may be as described above, however, as the autoscan mechanism 1030 is capable of moving the probe 1042 in at least two directions, the number of sampling ports 204 of the probe 1042, and hence the size of the probe 1042 and number of valves 802 in the sequencing device 702 (not shown in FIG. 8) may be reduced. The size of the probe 1042 is generally selected based on the number of contemplated passes required to scan the filter.

In the embodiment depicted in FIG. 10, the autoscan mechanism 1030 includes a first actuator 1002 and a second actuator 1004. The first actuator 1002 is coupled the filter module 1000. The second actuator 1004 is coupled to the first actuator 1002 and to the probe 1042. The first and second actuators 1002, 1004 may be configured and driven as described with reference to the other actuators above, or by any other suitable manner.

The first actuator 1002 moves the second actuator 1004, and hence the probe 1042, in a first direction. The first direction is generally along the length of the filter module 1000. If more than one sampling port is disposed in the probe 1042, the first actuator may either provide an incremental motion to allow sampling from all ports on a first probe pass in the first direction, or the first actuator may continuously move the probed along the complete length of the filter, then reverse direction, as needed, to allow other sample ports to be accessed by the tester 752. The pattern is repeated until all the area under the probe 1042 has been sampled, at which time, the second actuator 1004 incrementally moves the probe laterally over an untested area of the filter.

The first actuator 1002 is again utilized, as described above, to scan the new area under the probe. It is contemplated that other motion sequences may also be utilized to scan the filter.

Thus, a filter housing having an integrated autoscan mechanism is provide that facilitates testing of a filter, installed in a hood residing in the interstitial space of a structure, in an air flow direction into the housing. Moreover, embodiments of the invention also minimize the exposure of testing equipment within the cleanroom, thereby reducing cost associated with moving this equipment into and out of the cleanroom. In some embodiments, the invention includes facility configuration and testing protocol that enables at least some of the benefits stated above to be realized.

What is claimed is:

1. A filter module mountable in an interstitial space of a structure, comprising:

a filter housing having a mounting portion for coupling the housing to an aperture formed in the structure, the housing configured to reside in the interstitial space behind the structure;

a filter receiving aperture defined in the housing and circumscribed by the mounting portion, the filter receiving aperture exposed to a room side of the structure, and defining an airflow inlet of the housing;

a collar extending from the housing and disposed in the interstitial space of the structure, collar defining an airflow outlet of the housing;

a sealing portion defined in the housing and configured to provide an air-tight interface with a filter element deposed in the filter receiving aperture, the sealing portion including a flange;

a scan probe disposed in the housing;

a motion mechanism disposed in the housing configured to displace the scan probe; and a penetration extending through the flange of the sealing portion, the penetration having a first end coupled to the motion mechanism and a second end accessible from the room side of the sealing portion.

2. The filter module of claim 1, wherein the scan probe further comprises:
an elongated member; and
a plurality of sample ports formed in the elongated member.

3. The filter module of claim 1, wherein the scan probe further comprises:
a port facing the filter receiving aperture and having mouth area of about 1.44 square inches.

4. The filter module of claim 1, wherein the motion mechanism is coupled to an interior of the housing and is configured to displace the scan probe linearly.

5. The filter module of claim 4, wherein the motion mechanism is configured to displace the scan probe linearly in orthogonal directions.

6. The filter module of claim 1 further comprising:
a plurality of penetrations formed through the housing, each penetration having a first side exposed to a room side of the housing and a second side exposed to an interior of the housing.

7. The filter module of claim 6 further comprising:
at least one sample tube coupling the scan probe to one of the penetrations.

8. The filter module of claim 6, wherein at least one of the penetrations is suitable for transferring rotary motion through the housing to the motion mechanism.

9. The filter module of claim 6 further comprising:
a motor disposed in the housing and coupled to the motion mechanism; and
at least one lead coupling the motor to at least one of the penetrations.

10. The filter module of claim 1, wherein the motion mechanism further comprises:
a cylindrical actuator coupled to the housing.

11. The filter module of claim 1, wherein the motion mechanism further comprises:
a linear actuator coupled to the housing.

12. The filter module of claim 1, wherein the motion mechanism comprises at least one of a robot, x-y actuator, a linear actuator, a stepper or servo motor, a fluid power cylinder, a rod-less cylinder, a chain or belt drive, a rack and pinion gear arrangement, a ball screw, a lead screw an acme screw or a power screw.

13. The filter module of claim 1, wherein the motion mechanism comprises a rod-less cylinder coupled to the housing.

14. The filter module of claim 1 further comprising:
a sensor disposed in the housing and providing a metric indicative of a position of the probe.

15. The filter module of claim 14, wherein the sensor further comprises:
an encoder, a LVDT, limit switches, an optical device or a proximity sensor.

16. The filter module of claim 15, wherein the sensor further comprises:
a lead coupled to a penetration extending through the housing adjacent the filter receiving aperture.

17. The filter module of claim 1, further comprising:
a bubble-tight damper coupled to the housing and positionable to selectively control flow through the housing.

18. A filter module having an internal scan probe, comprising:
a filter housing having a filter receiving aperture exposed to a room side of a structure and a collar disposed in an interstitial space behind the structure, the aperture defining an airflow inlet of the housing and the collar defining an airflow outlet of the housing, the housing having a sealing portion configured to provide an air-tight interface with a filter element deposed in the filter receiving aperture, the sealing portion including a flange;
an autoscan mechanism disposed in the housing; and
a penetration extending through the flange of the sealing portion, the penetration having a first end coupled to the autoscan mechanism and a second end accessible from the room side of the sealing portion.

19. The filter module of claim 18 further comprising:
a damper coupled to the housing and positionable to selectively provide a bubble-tight seal therewith.

20. The filter module of claim 18, wherein the autoscan mechanism further comprises:
a particle sampling probe; and
a mechanism for selectively scanning the probe across the filter receiving aperture.

21. A cleanroom serviced by an exhaust filter module having an internal scan probe, comprising:
a cleanroom bound in part by a structure having an interstitial space defined behind the structure;
a filter housing mounting to the structure and residing primarily in the interstitial space, the housing having a filter receiving aperture exposed to the cleanroom and a collar disposed in the interstitial space behind the structure, the aperture defining an airflow inlet of the housing and the collar defining an airflow outlet of the housing, the housing having a sealing portion configured to provide an air-tight interface with a filter element deposed in the filter receiving aperture, the sealing portion including a flange;
a probe having at least one sample port disposed in the housing;
a mechanism for selectively scanning the probe across the filter receiving aperture; and
a penetration extending through the flange of the sealing portion, the penetration having a first end coupled to the sample port and a second end accessible from the room side of the sealing portion.

22. A method for testing a filter disposed in a housing disposed primarily in an interstitial space behind a structure to which that housing is mounted, the housing having a filter receiving aperture defining an airflow inlet of the housing, a collar defining an airflow outlet of the housing and a sealing portion configured to provide an air-tight interface with a filter element deposed in the filter receiving aperture, the sealing portion including a flange with a penetration extending therethrough, the method comprising:
flowing air from a room side of the filter into the housing;

scanning the filter with a probe disposed in the housing without opening the housing; and routing samples obtained by the probe through the penetration extending through the flange of the sealing portion.

23. The method of claim 22 wherein scanning further comprises:

moving the probe disposed in the housing to scan the entire filter in a single sweep.

24. The method of claim 22 wherein routing further comprises:

routing samples through the penetration to a tester disposed in a room in which the filter is operating.

25. The method of claim 22 wherein routing further comprises:

routing samples through the penetration to a tester disposed in a room remote from a room in which the filter is operating.

26. The method of claim 22 wherein flowing further comprises:

positioning a shroud proximate a face of the filter; and blowing air through the shroud and into the filter.

* * * * *